(12) United States Patent
Grigoryev (10) Patent No.: US 9,395,713 B2
(45) Date of Patent: Jul. 19, 2016

(54) METHOD AND SYSTEM OF PROTECTION OF TECHNOLOGICAL EQUIPMENT

(71) Applicant: IP Research LLC, Moorhead, MN (US)

(72) Inventor: Viacheslav Grigoryev, St. Petersburg (RU)

(73) Assignee: IP RESEARCH LLC, Moorhead, MN (US)

( * ) Notice: Subject to any disclaimer, the term of this patent is extended or adjusted under 35 U.S.C. 154(b) by 51 days.

(21) Appl. No.: 14/269,611

(22) Filed: May 5, 2014

(65) Prior Publication Data

US 2015/0316898 A1    Nov. 5, 2015

(51) Int. Cl.
| | |
|---|---|
| G05B 19/04 | (2006.01) |
| G05B 9/02 | (2006.01) |
| G05B 19/40 | (2006.01) |
| G05B 19/042 | (2006.01) |
| G05B 19/4069 | (2006.01) |

(52) U.S. Cl.
CPC ............ *G05B 19/0425* (2013.01); *G05B 9/02* (2013.01); *G05B 19/4069* (2013.01)

(58) Field of Classification Search
CPC ........ G05B 9/02; G05B 9/03; G05B 19/0428; G05B 13/048; G05B 13/042; G05B 17/02; G05B 13/04; G05B 19/0425; G05B 19/4069; B05C 11/1042; G03G 21/14
USPC .............. 700/81, 29, 44, 160, 173; 428/411.1
See application file for complete search history.

(56) References Cited

U.S. PATENT DOCUMENTS

| | | | | |
|---|---|---|---|---|
| 5,282,261 | A * | 1/1994 | Skeirik | 706/23 |
| 6,721,609 | B1 * | 4/2004 | Wojsznis et al. | 700/28 |
| 7,966,152 | B2 * | 6/2011 | Stluka et al. | 702/182 |
| 8,005,575 | B2 * | 8/2011 | Kirchhof | 700/287 |

(Continued)

OTHER PUBLICATIONS

Camponogara et al., Distributed Model Predictive Control: Synchronous and Asynchronous Computation, Sep. 2007, IEEE Transactions on Systems, Man, and Cybernetics, vol. 37, pp. 732-745.*

*Primary Examiner* — Kenneth M Lo
*Assistant Examiner* — Jason Lin
(74) *Attorney, Agent, or Firm* — Arent Fox LLP; Michael Fainberg (57) ABSTRACT

Disclosed are systems, methods, and computer program products for automatic monitoring of the performance of a technological process at industrial facilities. An example method for protecting technological equipment comprises: receiving control parameters of an operation for adoption by actuating elements of an equipment; establishing a range of values for at least one performance factor of the operation; determining a value of the at least one performance factor based on the control parameters; comparing the value of the at least one performance factor with the range of values; determining based on the comparison whether the value of the at least one performance factor is outside the range of values; and preventing the adoption of the control parameters by the actuating elements if it is determined that the value of the at least one performance factor is outside the range of values.

15 Claims, 5 Drawing Sheets

(56) References Cited

U.S. PATENT DOCUMENTS

| | | | |
|---|---|---|---|
| 2001/0012972 A1* | 8/2001 | Matsumoto et al. | 700/160 |
| 2003/0078680 A1* | 4/2003 | Edwards et al. | 700/29 |
| 2003/0125829 A1* | 7/2003 | Kakino et al. | 700/188 |
| 2007/0142935 A1* | 6/2007 | Danielsson et al. | 700/29 |
| 2007/0282487 A1* | 12/2007 | Kirchhof | 700/287 |
| 2008/0021571 A1* | 1/2008 | Kokotov et al. | 700/1 |
| 2009/0198369 A1* | 8/2009 | Xu et al. | 700/173 |
| 2011/0054639 A1* | 3/2011 | Pazzi | G06F 17/504 700/12 |
| 2012/0317259 A1* | 12/2012 | Shikano | H04L 12/6418 709/223 |
| 2014/0129024 A1* | 5/2014 | Lee et al. | 700/186 |

\* cited by examiner

METHOD AND SYSTEM OF PROTECTION OF TECHNOLOGICAL EQUIPMENT

TECHNICAL FIELD

The disclosure relates to the field of security software, and more specifically, to systems, methods and computer program products for protecting technological equipment at industrial facilities.

BACKGROUND

Hacker attacks are no longer of a virtual nature. Previously, the consequences of hacker attacks were corrupted or stolen documents and personal data. At present, systems whose operation is crucial to the daily lives of people have come under attack, and the loss from attacks on such systems will be truly irreparable. Such acts have been made possible by the fact that industrial systems are poorly protected against hackers, and the sending of deliberately wrong parameters to the actuating elements of equipment causes a denial of service or the system will begin to function in emergency mode. In response to such attacks, defenses are being developed to monitor the parameters being entered and not allow the use of parameters which go beyond safe ranges of values and which are able to cause the actuating elements of industrial systems to work in emergency mode or cause a malfunction, i.e., to filter the control parameters being entered, where permissible ranges are set by rules and regulations of the industry. But such measures are not able to defend against more sophisticated and complex attacks, when the control parameters transmitted to the actuating elements have permissible values, but are chosen such that the resultant of the working of the actuating elements to which the correct control parameters are sent will produce an emergency. The resultant of the working will be a critical operating parameter.

Let us consider the example of a metalworking machine with numerical control (NC) whose actuating elements are sent parameters that are permissible in accordance with the regulations (cutting depth, feed rate, speed of the drive unit, and so on). These parameters are checked by the protection system for compliance with the regulations and are transmitted for use by the actuating elements. But the protection system does not take into account that the set of such parameters in the particular cutting operation is not permissible and causes a cutting power not sustainable by the given equipment, causing an emergency. Modern machine tools are able to recognize a transgression of the permissible performance and halt the machining process, but the cutting tool has already been destroyed, the automatic line in which this machine tool was installed has been halted, and the work piece has been ruined. Such mistakes have been encountered in production more than once and as a rule they were not deliberate in nature, but everything changes when the system comes under the control of a hacker, and then even an isolated protection system will be unable to prevent a crash because from its perspective all of the entered parameters are correct.

This may happen anywhere at all, at a hydroelectric power plant, at an atomic power plant, and the consequences are not limited to tool breakage, but may end in a disaster with loss of human life. It is evident that protection systems have been created for industrial systems, but they have drawbacks. A passive system is unable to recognize a complex attack, it is merely a filter with rigidly defined limits. Active protection systems are able to shut down equipment and fix the crash, but some damage may have been already caused.

SUMMARY

Disclosed are systems, methods, and computer program products for automatic monitoring of the performance of a technological process at industrial facilities. The technical result of example aspects of the present invention is to heighten the working safety of technological equipment by detecting a transgression of the permissible values of the resulting work of the control parameters.

According to an aspect, an example method for protecting technological equipment comprises: receiving control parameters of an operation for adoption by actuating elements of an equipment; establishing a range of values for at least one performance factor of the operation; determining a value of the at least one performance factor based on the control parameters; comparing the value of the at least one performance factor with the range of values; determining based on the comparison whether the value of the at least one performance factor is outside the range of values; and preventing the adoption of the control parameters by the actuating elements if it is determined that the value of the at least one performance factor is outside the range of values.

In another aspect, the method may further comprise storing the determined value of the at least one performance factor base do the control parameters in a database.

In another aspect, determining the value of the at least one performance factor may comprise retrieving the value from the database.

In another aspect, determining the value of the at least one performance factor may be based on operating duties of the equipment.

In another aspect, determining the value of the at least one performance factor may comprise modeling the value in an asynchronous operating mode.

In another aspect, determining the value of the at least one performance factor may comprise modeling the value in a synchronous operating mode.

In another aspect, receiving the control parameters comprises at least one of receiving the control parameters when the control parameters are entered into a system by an operator, receiving the control parameters when the control parameters are transmitted to a zone of the actuating elements, receiving the control parameters when the control parameters are transmitted directly to one of the actuating elements, receiving the control parameters from at least one sensor of the equipment at a moment of adoption of the control parameters by the actuating elements.

According to another aspect, an example system for protecting technological equipment comprising: a hardware processor configured to receive control parameters of an operation for adoption by actuating elements of an equipment; establish a range of values for at least one performance factor of the operation; determine a value of the at least one performance factor based on the control parameters; compare the value of the at least one performance factor with the range of values; determine based on the comparison whether the value of the at least one performance factor is outside the range of values; and prevent the adoption of the control parameters by the actuating elements if it is determined that the value of the at least one performance factor is outside the range of values.

According to yet another aspect, a computer program product, which may be stored on a non-transitory computer-readable storage medium, comprises computer-executable instructions for protecting technological equipment, including instructions for: receiving control parameters of an operation for adoption by actuating elements of an equipment; establishing a range of values for at least one performance factor of the operation; determining a value of the at least one performance factor based on the control parameters; comparing the value of the at least one performance factor with the range of values; determining based on the comparison whether the value of the at least one performance factor is outside the range of values; and preventing the adoption of the control parameters by the actuating elements if it is determined that the value of the at least one performance factor is outside the range of values.

The above simplified summary of example aspect(s) serves to provide a basic understanding of the invention. This summary is not an extensive overview of all contemplated aspects of the invention, and is intended to neither identify key or critical elements of all aspects nor delineate the scope of any or all aspects. Its sole purpose is to present one or more aspects in a simplified form as a prelude to the more detailed description of the invention that follows. To the accomplishment of the foregoing, the one or more aspects comprise the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Example aspects are described herein in the context of a system, method and computer program product for protecting technological equipment at industrial facilities. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
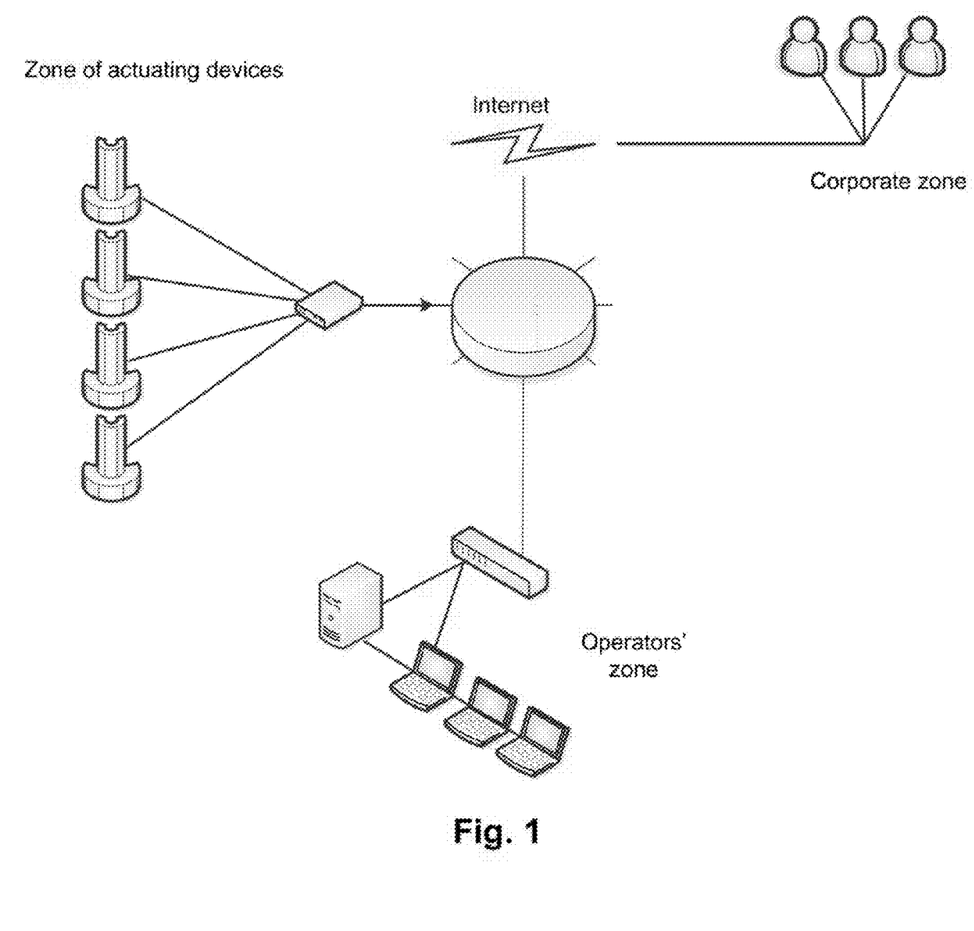
FIG. 1 is a diagram illustrating an example aspect of a system for protecting technological equipment according to one aspect of the invention.

FIG. 1 is a diagram illustrating an example aspect of a system for protecting technological equipment according to one aspect of the invention. Specifically, FIG. 1 shows an example of a corporate infrastructure, with a corporate zone (not having any relation to control, dealing solely with business processes), an operators' zone (where the operators of the automated control system of the technological process are stationed, being able to influence the course of the technological process), and a zone of actuating devices (the direct link where the technological processes take place, such as processing of ammonia or control of oil movement). In a particular case, the electronic componentry of the devices used in the zone of actuating devices may not allow the use of such popular technologies as IPSec, SSL, or the organizing of VPN. Even so, access to these devices may be necessary at all times. Some of these devices may act as information gathering devices (i.e., telemetry) for the performance parameters of the technological process from data units, and so forth. They may also store alarm and malfunction messages. In this regard, the devices may be assigned a public access IP address, which may be done frequently. In some situations this may not be avoided, given mistakes made in the network design. For example, modern industrial controllers may be connected directly or via a modem. When connected via a modem, the controllers may often be combined with GPRS/GSM modems, which by default may give the device the IP address of the mobile operator. With such a configuration, the controllers may be vulnerable to attacks from outside. A hacker may identify such devices with specialized utilities and methods and commit many crimes. The actuating devices themselves may generally be hooked up by serial interface (RS-232/RS-485) to a MODBUS server, and the MODBUS server may have control directly using TCP/IP across an Ethernet/Industrial Ethernet channel with the operators. The operators may be able to connect to the SCADA (supervisory control and data acquisition) system, usually with varying level of privileges, plan and adopt new projects, or alter existing ones. The people who generally constitute the organization are located in the corporate zone. This may be the case in the power engineering or oil transport industries—their entire operation may be found on different continents, in the form of lines of power-generating complexes or oil wells in Libya, for example, while they themselves are located in a different country.

Control parameters may be sent from the operators or the automated control systems of technological processes (ACSTP) to the equipment of the actuating zone. The control parameters are the values of a certain regulated quantity for control of the actuating elements of the equipment. These values indicate, for example, what temperature needs to be set, what operating speed needs to be assigned, what distance to move, and so forth. Having received these parameters in an equivalent of the input signal (electrical, optical, mechanical, pneumatic, etc.), the actuating elements adopt these parameters.

The actuating elements are transducers which convert an input signal (e.g. electrical, optical, mechanical, pneumatic, etc.) into an output signal (e.g., a movement), which will be the control parameter to be used. Devices of this type may include: electric motors, electric, pneumatic or hydraulic drive units, relays, electrostatic motors, DMD (Digital Micromirror Device) mirrors and electroactive polymers, the gripping mechanisms of robots, the drive units for their moving parts, including solenoid drives and "voice coil" type drives, as well as many others.

The principle of operation of an electric actuating element, for example, may include converting an electric signal (the electrical equivalent of the control parameter) arriving from a regulating, or controlling device (from an operator or an ACSTP) into a displacement of an output element, and transmitting a positioning force or torque to a regulating element. For example, the operator may order a turning of a valve by 30 degrees. This control parameter is transformed into an electrical signal (an equivalent), for example, at the controller of the actuating element, and transmitted to a motor, which transforms the electrical signal into a mechanical rotation. The rotation will be just enough to ensure a turning of the valve by 30 degrees. The actuating element may be stationed near or on the regulating elements and connected to them by means of linkage, levers, spindles, rods or other strong structural elements.

Aspects of the present invention may include monitoring the performance factor (e.g., work resultant) of the control parameters adopted by the actuating elements (e.g., cutting power, water level in a reservoir, temperature in a reactor) until such time as the control parameters or their equivalents (e.g., electrical, optical, mechanical, pneumatic, etc.) have been transmitted to the actuating elements and adopted. The performance factor is the effect of the totality of adopted parameters and the value of the performance factor may only be influenced indirectly, through the control parameters. In a particular instance, the performance factor may be monitored by known formulas (a mathematical model) within the proposed protection system. The protection system may receive the parameters entered from the input device and insert the received parameters into known formulas to check the performance factor based on the parameters. If the performance factor has a permissible value, the protection system will allow the parameters for use by the actuating elements; if the performance factor has an impermissible value, the protection system will halt the working and block the adoption of the parameters entered on the entire accessible equipment, until this block is removed from the outside.

Figure 2:
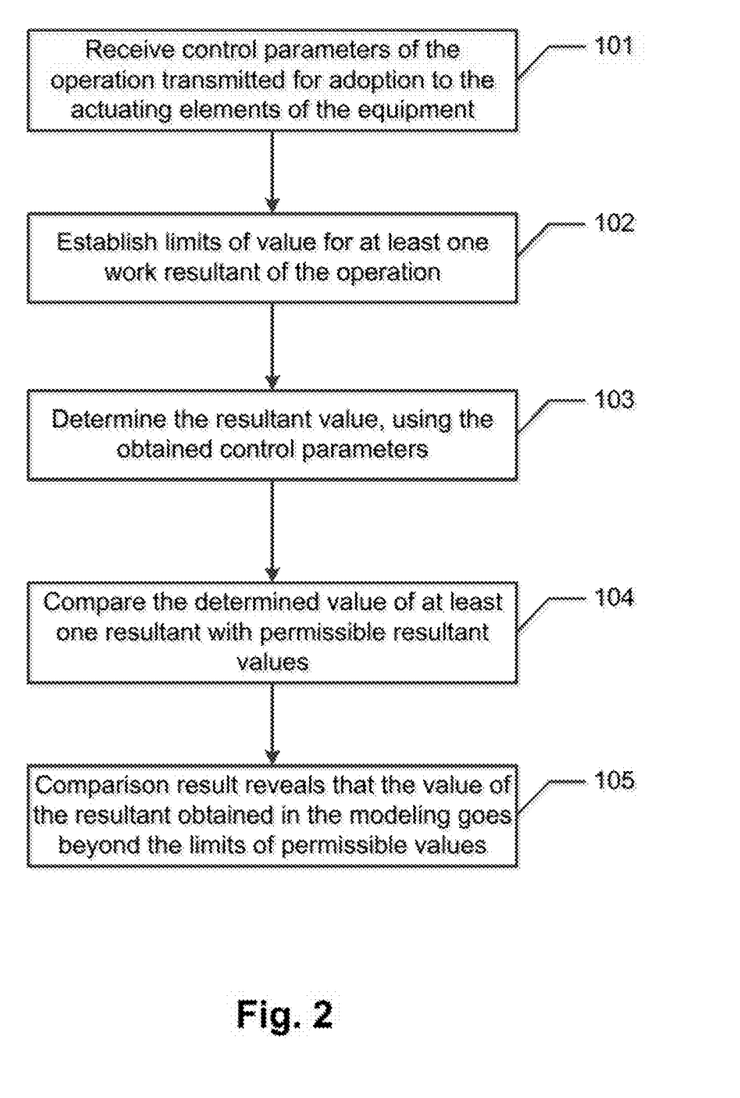
FIG. 2 is a flow diagram illustrating an example method for protecting technological equipment according to one aspect of the invention.

FIG. 2 is a flow diagram illustrating an example method for protecting technological equipment according to one aspect of the invention. As shown in FIG. 2, the process may begin in block 101, where control parameters of the operation may be received. The operation may indicate a technological process of a system, aimed at accomplishing a goal (e.g., the turning of a valve, the machining of a work piece, the opening of a gate, and so on) by means of the adoption of the control parameters by the actuating elements of the equipment. The control parameters in one particular instance may be obtained by interception of values during entry by the operators, in another particular instance equivalents of the control parameters may be detected and transformed into numerical values; the parameters may also be obtained from controllers of the actuating elements of the equipment. Limits may then be established for the permissible values of the work performance factor for the operation 102. The permissible values of the performance factor in one particular instance may be taken from a database, in another particular instance the settings of monitoring sensors are used. Having obtained the permissible values and the control parameters, the performance factor of the operation with the obtained control parameters may be determined 103. For this, table values of the performance factor from a database may be used, having been calculated in advance (an example will be given below) or a modeling may be done. For the modeling, one may use various mathematical models of the operation that are adopted by engineers and designers in the modeling of technological processes. As a result of the modeling, one may determine the value of the work performance factor. After determining the value of the performance factor, the obtained value may be compared with the permissible values previously found 104; if it is discovered that the performance factor so determined goes beyond the range of permissible values 105, in one particular instance the adoption of the control parameters by the actuating elements of the equipment may be forbidden.

Figure 3:
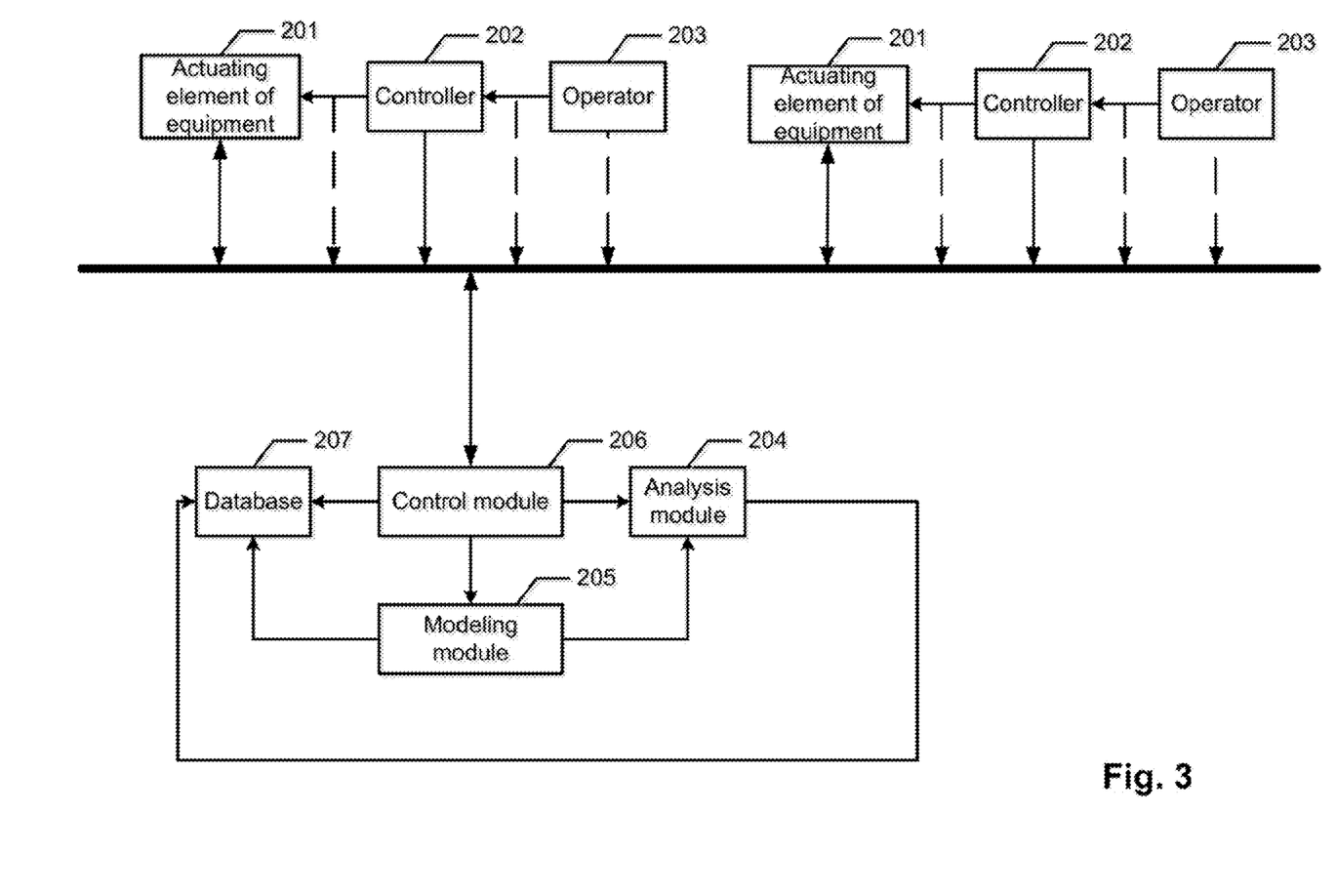
FIG. 3 is a diagram illustrating an example aspect of a system for protecting technological equipment according to one aspect of the invention.

FIG. 3 is a diagram illustrating an example aspect of a system for protecting technological equipment according to one aspect of the invention. Specifically, FIG. 3 shows a system implementing the above-described method. A control module 206 receives control parameters of an operation. The control module 206, as shown in FIG. 3, is able to obtain the values of the control parameters at any given stage: when these parameters are entered into the system by the operator 203; when the parameters are transmitted to the zone of the actuating devices; from a controller 202; when transmitted directly to an actuating element 201; from the sensors of the equipment at the moment of adoption of the control parameters, and so forth. An analysis module 204 may establish the limits of the permissible values of the work performance factor (e.g., a range of permissible values for the performance factor), for example, by a query sent to a database 207. The control module 206 may transmit the obtained values of the control parameters to a modeling module 205, which may determine the performance factor by using the obtained control parameters. The modeling module may then transmit the value of the performance factor as determined by the modeling to the analysis module 204. The analysis module may compare the value of at least one performance factor as determined by the modeling module to the permissible performance factor values whose limits were previously established. The result of the comparison may be sent by the analysis module 204 to the control module 206. If the analysis module 204 discovers that the value of the performance factor so determined is beyond the limits of the permissible values, in a particular instance the control module 206 may forbid the adoption of the control parameters by the actuating elements of the equipment 201.

The protection system may be disposed either on the input device 203, where there is a direct entry of the control parameters and software interceptors of the data so entered, or be isolated from the main network, and obtain the control parameters from hardware interceptors installed directly on the actuating elements of the equipment or on lines connecting the actuating elements and a controller, a controller and input devices 203, and so on. Thus, the protection system may perform a mathematical modeling of the working of the system being monitored. Modeling may include a determination of the operating duties of the equipment and the critical performance factor, where the input parameters will be the parameters for the actuating elements of the equipment. The modeling may be an analog modeling, which may be done by the engineers when creating the technological process. If a hacker takes control of all the input terminals 203 and the computers of the technological chain and sends to the actuating elements parameters that will pass through the filter, because these parameters are correct, the described system upon intercepting these parameters and modeling the operation will determine that the performance factor resulting from adopting these parameters is not permissible and will result in a malfunction, and it will not permit the use of these parameters by the actuating elements of the equipment and it will issue an alarm signal.

Since industrial systems are real time systems, the most complex modeling of such a system can be done in an asynchronous operating mode. Also to speed up the modeling, one may use a teaching of the system, where various control parameters will be entered and the protection system will model the performance factor, the results of the teaching may be used to fill up a database, and this may be consulted by the protection system; if the situation was previously modeled, the protection system may simply extract the value of the performance factor from the database; if such a situation was not modeled, it may initiate a modeling, which can be either synchronous or asynchronous. The benefits of an asynchronous modeling are that the condition is fulfilled for the work in real time systems; the benefits of synchronous modeling are that even a temporary functioning of the equipment with parameters causing an impermissible resultant is not permitted.

Figure 4:
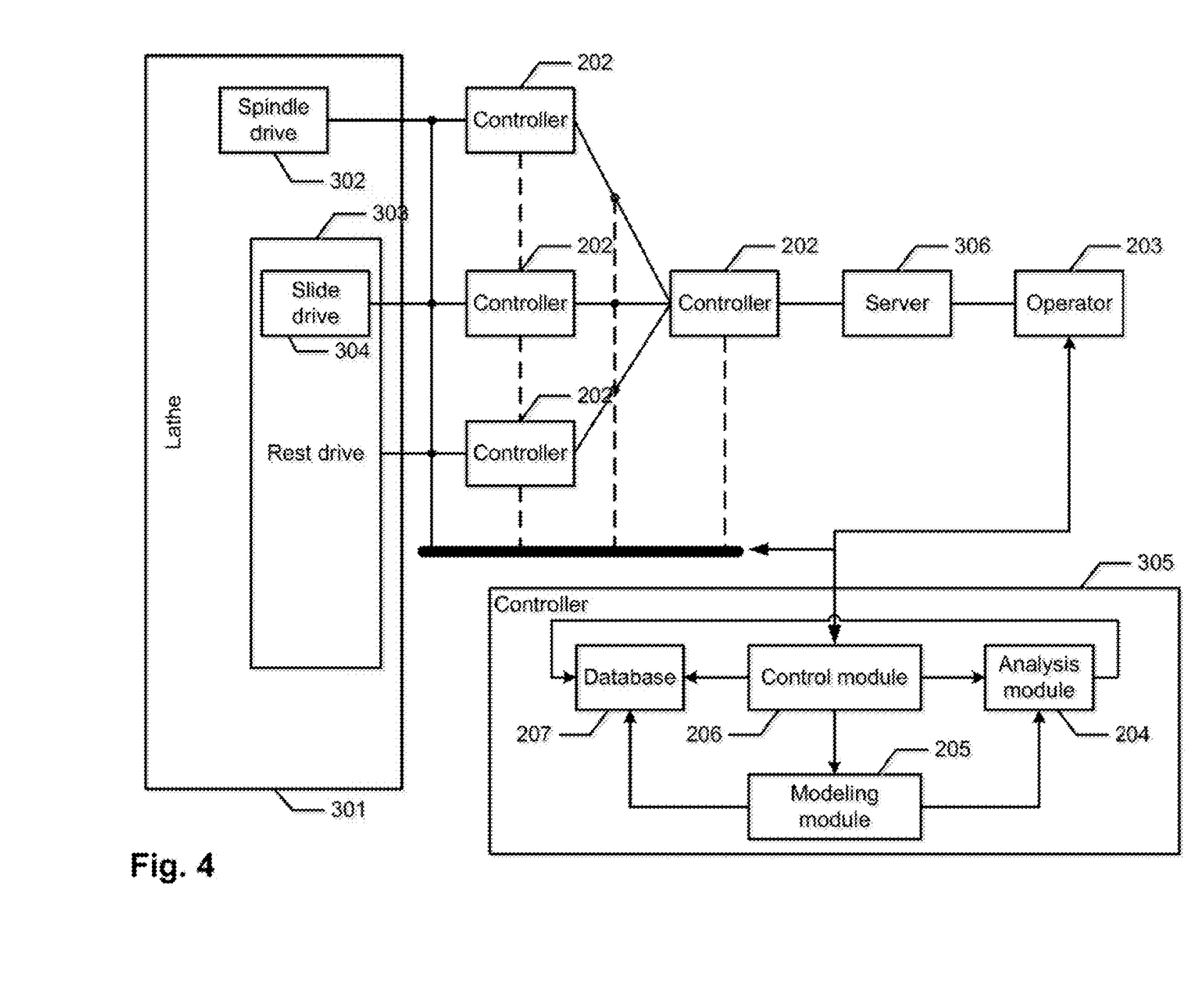
FIG. 4 is a diagram illustrating an example aspect of a system for protecting technological equipment according to one aspect of the invention.

FIG. 4 is a diagram illustrating an example aspect of a system for protecting technological equipment according to one aspect of the invention. Specifically, FIG. 4 shows an example of an enterprise network with corporate zone, operators zone, and zone of actuating devices. In the zone of actuating devices there may be installed a lathe 301. An operation of machining of a metal rod may be carried out on the lathe 301. The actuating elements in this case may be the lathe spindle drive 302, the work rest drive 303 and the slide drive 304. The control parameters for the operation may be the turning speed of the spindle (spindle drive), the feed rate (work rest drive), and the cutting depth (slide drive). The control parameters may be checked for permissible values and entered by an operator 203 for adoption by the actuating elements of the equipment. To enhance the operating reliability of the equipment, the parameters may be additionally checked by controllers of the actuating elements 202 for the permissibility of the values, since the channel from operator to equipment is not secure and parameters transmitted by this channel may be intercepted and modified. The modification may be done either on the operator's device or on any segment of the network channel. An example aspect may also perform a modeling of the cutting operation. In a particular instance, a supplemental modeling controller 305 may be used for this, which is connected to the drive controllers 202. The drive controllers 202, before the movement of the actuating element is performed, may send the control parameters to the controller 305, which may determine the performance factor of the cutting operation and check the permissibility of the performance factor values. In this example, the work performance factor may, for example, be a cutting power. The cutting power may be determined by the algorithm described below.

The controllers 202 may receive the control parameters (cutting depth, feed rate, turning speed of the spindle) for their adoption by the actuating elements of the equipment: the spindle drive 302, the rest drive 303, the slide drive 304. The controllers 202 may send the control parameters to the protection controller 305. The controller 305, using, for example, the known formulas:

$$v_\phi = \frac{\pi D n}{1000} - \text{cutting speed}$$
$$P_z = 10 \cdot C_p \cdot t^x \cdot S^y \cdot v_\phi^n \cdot K_p - \text{cutting force}$$
$$N_p = \frac{P_z v_\phi}{1020 \cdot 60} - \text{cutting power,}$$

where S is the feed rate, t is the cutting depth, and n is the turning speed of the spindle, determines the value of the cutting power. After obtaining the value of the cutting power, the controller may compare this to the maximum permissible value of the cutting power. If the determined value of cutting power exceeds the permissible values of the cutting power, the control module may then report this to the operator 203 and halt the adoption of the control parameters by the actuating elements of the equipment.

According to one aspect for the determining of the performance factor to speed up the verification the cutting power may be taken from a database 207. The database may be filled up as follows: after a modeling by the above-described method, the control nodule may place in the database 207 the determined value of the performance factor and its corresponding control parameters. The next time that the control module 206 receives control parameters from the controllers 202, the control module 206 may consult the database 207 and see whether the performance factor value for the received control parameters was previously calculated. If the control module 206 finds no such match, the control parameters may be transmitted to the modeling module for determination of the resultant.

Figure 5:
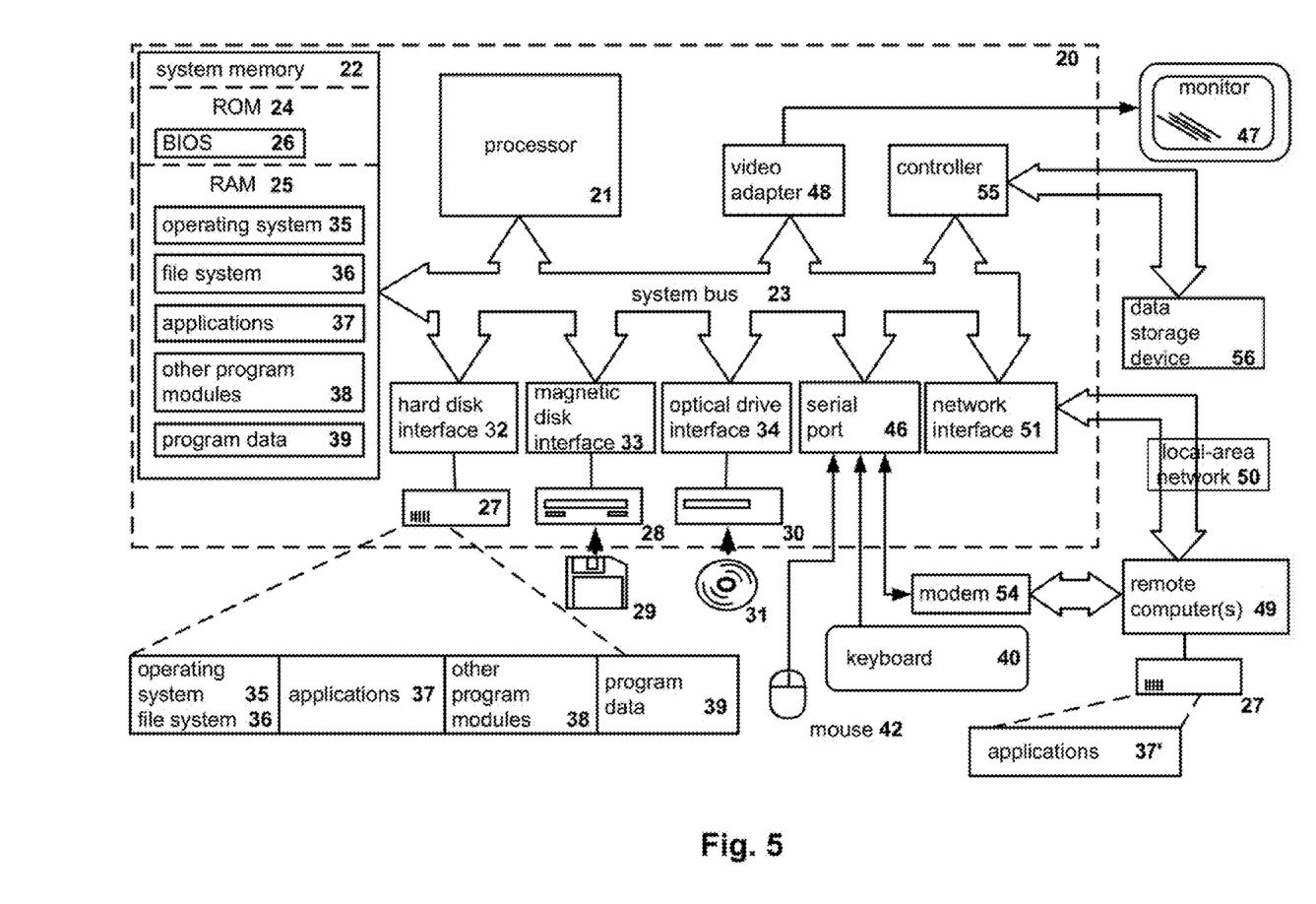
FIG. 5 is a diagram illustrating an example aspect of a general-purpose computer system on which are implemented the systems and methods for protecting technological equipment in accordance with aspects of the invention.

FIG. 5 is a diagram illustrating an example aspect of a general-purpose computer system on which are implemented the systems and methods for protecting technological equipment in accordance with aspects of the invention. Specifically, FIG. 5 shows an example of a general-purpose computer system (which can be a personal computer or a server) 20, containing a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory contains permanent memory (ROM) 24 and random-access memory (RAM) 25. The basic input/output system (BIOS) 26 contains the basic procedures ensuring the transfer of information between elements of the personal computer 20, such as those at the time of loading the operating system with the use of the ROM 24.

The personal computer 20, in turn, contains a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent means of storage of computer instructions, data structures, program modules and other data of the personal computer 20.

The present specification reveals the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by means of input devices (keyboard 40, mouse 42). Other input devices (not shown) can be used microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to work in a network environment, using a network connection to one or more remote computers 49. The remote computer (or computers) 49 are also personal computers or servers having the majority or all of the aforementioned elements in describing the nature of a personal computer 20, as shown in FIG. 5. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other means of providing communications with a wide-area computer network such as the Internet. The modem 54, which is an internal or external device, is connected to the system bus 23 by means of a serial port 46. It should be noted that the network connections are only examples and need not depict the exact configuration of the network, i.e., in reality there are other ways of establishing a connection of one computer to another by technical communication means.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 5 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for protecting processing equipment of at least one actuating element by determining whether control parameters for the processing equipment comply with valid control parameters, the method comprising:
   modeling a plurality of performance factors of at least one actuating element based on a plurality of sets of the valid control parameters, respectively;
   storing, in a database, the modeled performance factors and the plurality of sets of valid control parameters;
   intercepting control parameters output from a controller and intended to control the processing equipment of the at least one actuating element before the control parameters are received by the intended processing equipment;
   determining whether the intercepted control parameters match any of the valid control parameters stored in the database and, upon a match, accessing a corresponding modeled performance factor for the matched valid control parameters;
   accessing, from the database, a predetermined range of values for a permissible performance factor of the at least one actuating element;
   comparing the accessed modeled performance factor with the range of values for the permissible performance factor;
   if the intercepted control parameters do not match any of the valid control parameters stored in the database, selecting a mathematical model to calculate a predictive performance factor of the least one actuating element based on the intercepted control parameters and comparing the predictive performance factor with the range of values for the permissible performance factor;
   preventing the intercepted control parameters from being input to the processing equipment of the at least one actuating element when either the modeled performance factor or the calculated predictive performance factor is outside the range of values for the permissible performance factor; and
   allowing the intercepted control parameters to be inputted into the processing equipment to control the at least one actuating element when either the modeled performance factor or the calculated predictive performance factor is within the range of values for the permissible performance factor.

2. The method of claim 1, further comprising storing in the database a plurality of values of the calculated predictive performance factor by the selected mathematical model for a plurality of values of the control parameters.

3. The method of claim 1, wherein the calculating of the value of the performance factor comprises synchronous modeling the value for continuous prevention of controlling the at least one actuating element when the calculated performance factor is outside the range of values.

4. The method of claim 3, wherein the synchronous modeling comprises:
for the control parameters values previously used for mathematical modeling the value stored in a database, retrieving the value from the database; and
for the control parameters values not used for mathematical modeling the value stored in the database, obtaining the value by modeling the equipment for the control parameters values.

5. The method of claim 1, wherein intercepting the control parameters further comprises at least one of intercepting the control parameters when the control parameters are entered into a system by an operator and intercepting the control parameters when the control parameters are transmitted to a zone of the actuating elements.

6. A system for protecting technological processing equipment of at least one actuating element by determining whether control parameters for the processing equipment comply with valid control parameters, the system comprising:
a hardware processor configured to:
model a plurality of performance factors of at least one actuating element based on a plurality of sets of the valid control parameters, respectively;
store, in a database, the modeled performance factors and the plurality of sets of valid control parameters;
intercept control parameters output from a controller and intended to control the processing equipment of the at least one actuating element before the control parameters are received by the intended processing equipment;
determine whether the intercepted control parameters match any of the valid control parameters stored in the database and, upon a match, access a corresponding modeled performance factor for the matched valid control parameters;
access, from the database, a predetermined range of values for a permissible performance factor of the at least one actuating element;
compare the accessed modeled performance factor with the range of values for the permissible performance factor;
if the intercepted control parameters do not match any of the valid control parameters stored in the database, select a mathematical model to calculate a predictive performance factor of the least one actuating element based on the intercepted control parameters and compare the predictive performance factor with the range of values for the permissible performance factor;
prevent the intercepted control parameters from being input to the processing equipment of the at least one actuating element when either the modeled performance factor or the calculated predictive performance factor is outside the range of values for the permissible performance factor; and
allow the intercepted control parameters to be inputted into the processing equipment to control the at least one actuating element when either the modeled performance factor or the calculated predictive performance factor is within the range of values for the permissible performance factor.

7. The system of claim 6, wherein the processor further configured to store in the database a plurality of values of the calculated predictive performance factor by the selected mathematical model for a plurality of values of the control parameters.

8. The system of claim 6, wherein the calculating of the value of the performance factor comprises synchronous modeling the value for continuous prevention of controlling the at least one actuating element when the calculated performance factor is outside the range of values.

9. The system of claim 8, wherein the synchronous modeling comprises:
for the control parameters values previously used for mathematical modeling the value stored in a database, retrieving the value from the database; and
for the control parameters values not used for mathematical modeling the value stored in the database, obtaining the value by modeling the equipment for the control parameters values.

10. The system of claim 6, wherein intercepting the control parameters further comprises at least one of intercepting the control parameters when the control parameters are entered into a system by an operator and intercepting the control parameters when the control parameters are transmitted to a zone of the actuating elements.

11. A computer program product stored on a non-transitory computer-readable storage medium, the computer program product comprising computer-executable instructions for protecting processing equipment of at least one actuating element by determining whether control parameters for the processing equipment comply with valid control parameters, including instructions for:
modeling a plurality of performance factors of at least one actuating element based on a plurality of sets of the valid control parameters, respectively;
storing, in a database, the modeled performance factors and the plurality of sets of valid control parameters;
intercepting control parameters output from a controller and intended to control the processing equipment of the at least one actuating element before the control parameters are received by the intended processing equipment;
determining whether the intercepted control parameters match any of the valid control parameters stored in the database and, upon a match, accessing a corresponding modeled performance factor for the matched valid control parameters;
accessing, from the database, a predetermined range of values for a permissible performance factor of the at least one actuating element;
comparing the accessed modeled performance factor with the range of values for the permissible performance factor;
if the intercepted control parameters do not match any of the valid control parameters stored in the database, selecting a mathematical model to calculate a predictive performance factor of the least one actuating element based on the intercepted control parameters and comparing the predictive performance factor with the range of values for the permissible performance factor;
preventing the intercepted control parameters from being input to the processing equipment of the at least one actuating element when either the modeled performance factor or the calculated predictive performance factor is outside the range of values for the permissible performance factor; and allowing the intercepted control parameters to be inputted into the processing equipment to control the at least one actuating element when either the modeled performance factor or the calculated predictive performance factor is within the range of values for the permissible performance factor.

12. The computer program product of claim 11, further comprising instructions for:

storing in the database a plurality of values of the calculated predictive performance factor by the selected mathematical model for a plurality of values of the control parameters.

13. The computer program product of claim 11, further comprising calculating of the value of the performance factor comprises synchronous modeling the value for continuous prevention of controlling the at least one actuating element when the calculated performance factor is outside the range of values.

14. The computer program product of claim 13, wherein the synchronous modeling comprises:

for the control parameters values previously used for mathematical modeling the value stored in a database, retrieving the value from the database; and for the control parameters values not used for mathematical modeling the value stored in the database, obtaining the value by modeling the equipment for the control parameters values.

15. The computer program product of claim 11, wherein intercepting the control parameters further comprises at least one of intercepting the control parameters when the control parameters are entered into a system by an operator and intercepting the control parameters when the control parameters are transmitted to a zone of the actuating elements.

* * * * *